United States Patent
Akiyoshi et al.

(10) Patent No.: US 10,790,710 B2
(45) Date of Patent: *Sep. 29, 2020

(54) POWER FEEDING UNIT, POWER FEEDING SYSTEM, AND ELECTRONIC UNIT

(71) Applicant: SONY CORPORATION, Tokyo (JP)

(72) Inventors: Koichi Akiyoshi, Chiba (JP); Yoichi Uramoto, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 557 days.

This patent is subject to a terminal disclaimer.

(21) Appl. No.: 15/010,053

(22) Filed: Jan. 29, 2016

(65) Prior Publication Data
US 2016/0164336 A1 Jun. 9, 2016

Related U.S. Application Data

(63) Continuation of application No. 14/357,840, filed as application No. PCT/JP2012/082008 on Dec. 11, 2012.

(30) Foreign Application Priority Data

Dec. 21, 2011 (JP) .................................. 2011-279238
Apr. 17, 2012 (JP) .................................. 2012-093835

(51) Int. Cl.
H02J 7/00 (2006.01)
H02J 50/90 (2016.01)
(Continued)

(52) U.S. Cl.
CPC ............. H02J 50/90 (2016.02); H02J 5/005 (2013.01); H02J 7/025 (2013.01); H02J 50/12 (2016.02);
(Continued)

(58) Field of Classification Search
CPC ...... H02J 7/025; H02J 5/005; H02J 2007/005; H02J 2007/0096
(Continued)

(56) References Cited

U.S. PATENT DOCUMENTS

2009/0174264 A1* 7/2009 Onishi .................... H02J 5/005
307/104
2010/0066305 A1* 3/2010 Takahashi ............. H01M 10/44
320/108
(Continued)

FOREIGN PATENT DOCUMENTS

CN 101330230 A 12/2008
CN 101483357 A 7/2009
(Continued)

OTHER PUBLICATIONS

International Search Report dated Jan. 15, 2013 in PCT/JP2012/082008.
(Continued)

Primary Examiner — Nathaniel R Pelton
(74) Attorney, Agent, or Firm — Oblon, McClelland, Maier & Neustadt, L.L.P.

(57) ABSTRACT

A power feeding unit includes an electricity transmission section configured to perform electricity transmission using one of a magnetic field and an electric field to a power-feeding objective unit having a secondary battery, and an electricity transmission control section configured to control electricity transmission operation of the electricity transmission section. The electricity transmission control section allows the electricity transmission operation to be suspended when charge of the secondary battery is completed based on power provided through the electricity transmission, and
(Continued)

allows the electricity transmission operation to be restarted when a predetermined condition is satisfied after completion of the charge.

15 Claims, 8 Drawing Sheets

(51) Int. Cl.
- *H02J 50/40* (2016.01)
- *H02J 50/12* (2016.01)
- *H02J 50/80* (2016.01)
- *H02J 5/00* (2016.01)
- *H02J 7/02* (2016.01)

(52) U.S. Cl.
CPC .............. *H02J 50/40* (2016.02); *H02J 50/80* (2016.02); *H02J 7/00034* (2020.01); *H02J 7/0048* (2020.01)

(58) Field of Classification Search
USPC .......................................................... 320/108
See application file for complete search history.

(56) References Cited

U.S. PATENT DOCUMENTS

| | | | |
|---|---|---|---|
| 2010/0171461 A1* | 7/2010 | Baarman | H02J 5/005 320/108 |
| 2012/0313579 A1* | 12/2012 | Matsumoto | H02J 7/025 320/108 |

FOREIGN PATENT DOCUMENTS

| | | | |
|---|---|---|---|
| CN | 101645618 A | | 2/2010 |
| CN | 101841904 A | | 9/2010 |
| JP | 2001-102974 A | | 4/2001 |
| JP | 2002-34169 A | | 1/2002 |
| JP | 2003-110669 A | | 4/2003 |
| JP | 2005-110399 A | | 4/2005 |
| JP | 2008-206233 A | | 9/2008 |
| JP | 2008-206297 | | 9/2008 |
| JP | 2009-189230 A | | 8/2009 |
| JP | 2010-35417 A | | 2/2010 |
| JP | 2010-63245 A | | 3/2010 |
| JP | 2011-211760 A | | 10/2011 |
| JP | 2011-254643 A | | 12/2011 |
| WO | WO 00/27531 A1 | | 5/2000 |
| WO | WO2011118371 | * | 9/2011 |

OTHER PUBLICATIONS

Office Action dated Sep. 1, 2015 in Japanese Patent Application No. 2012-093835.

Combined Chinese Office Action and Search Report dated Oct. 10, 2015 in Patent Application No. 201280061948.7 (with English language translation).

Office Action dated Jun. 10, 2015 in Japanese Patent Application No. 2012-093835.

Office Action dated Mar. 26, 2020 in Chinese Application No. 201710906146.6, along with an English translation.

* cited by examiner

[ FIG. 1 ]
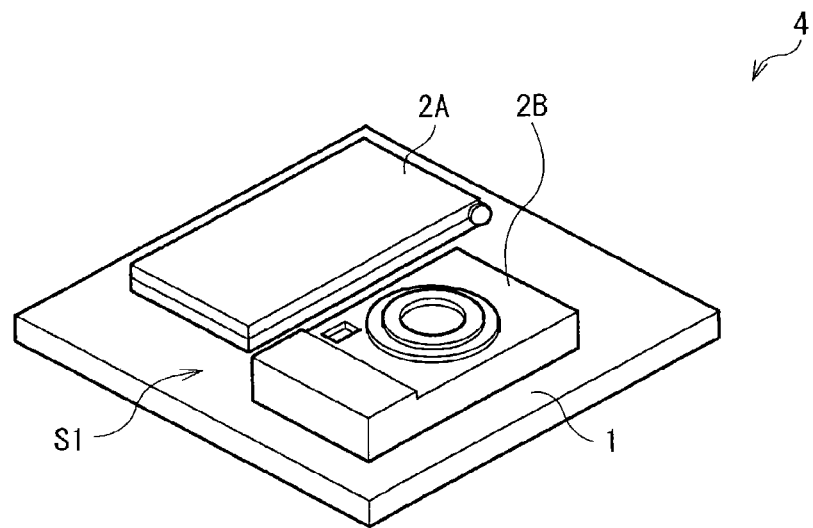

[FIG. 2]
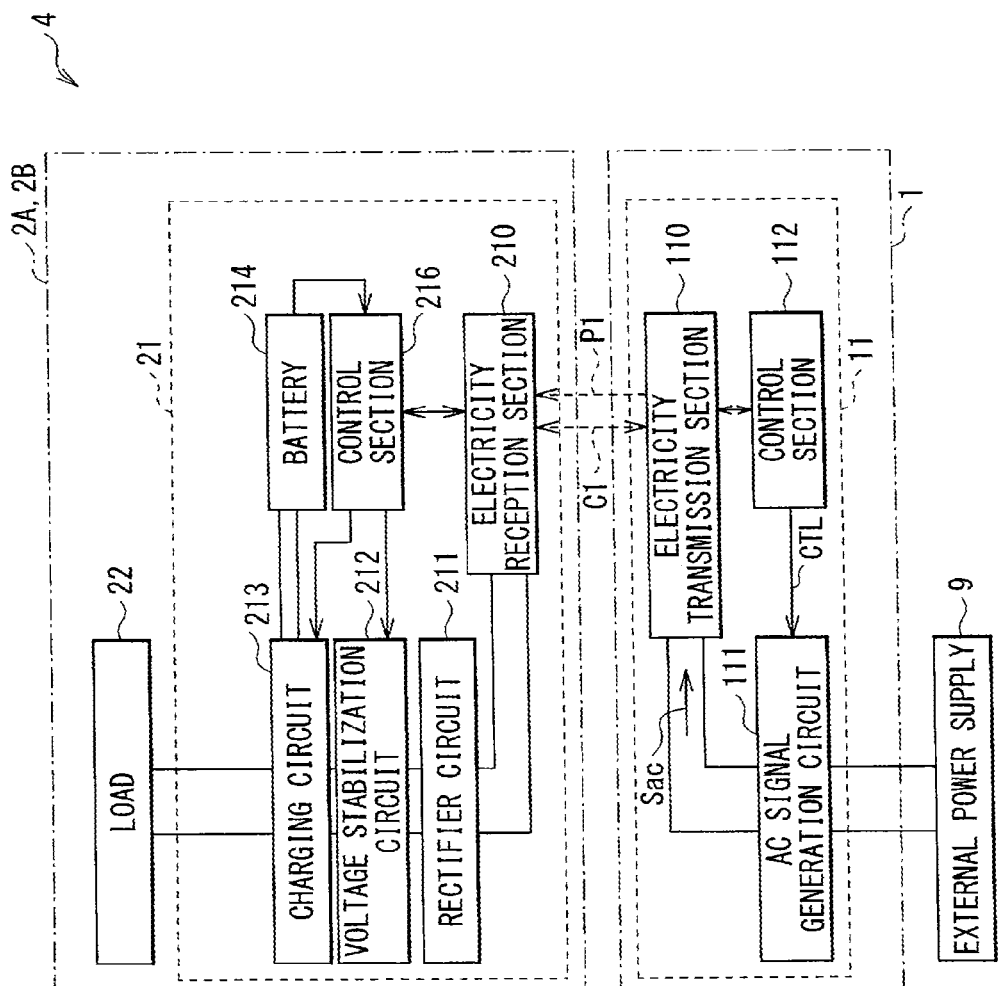

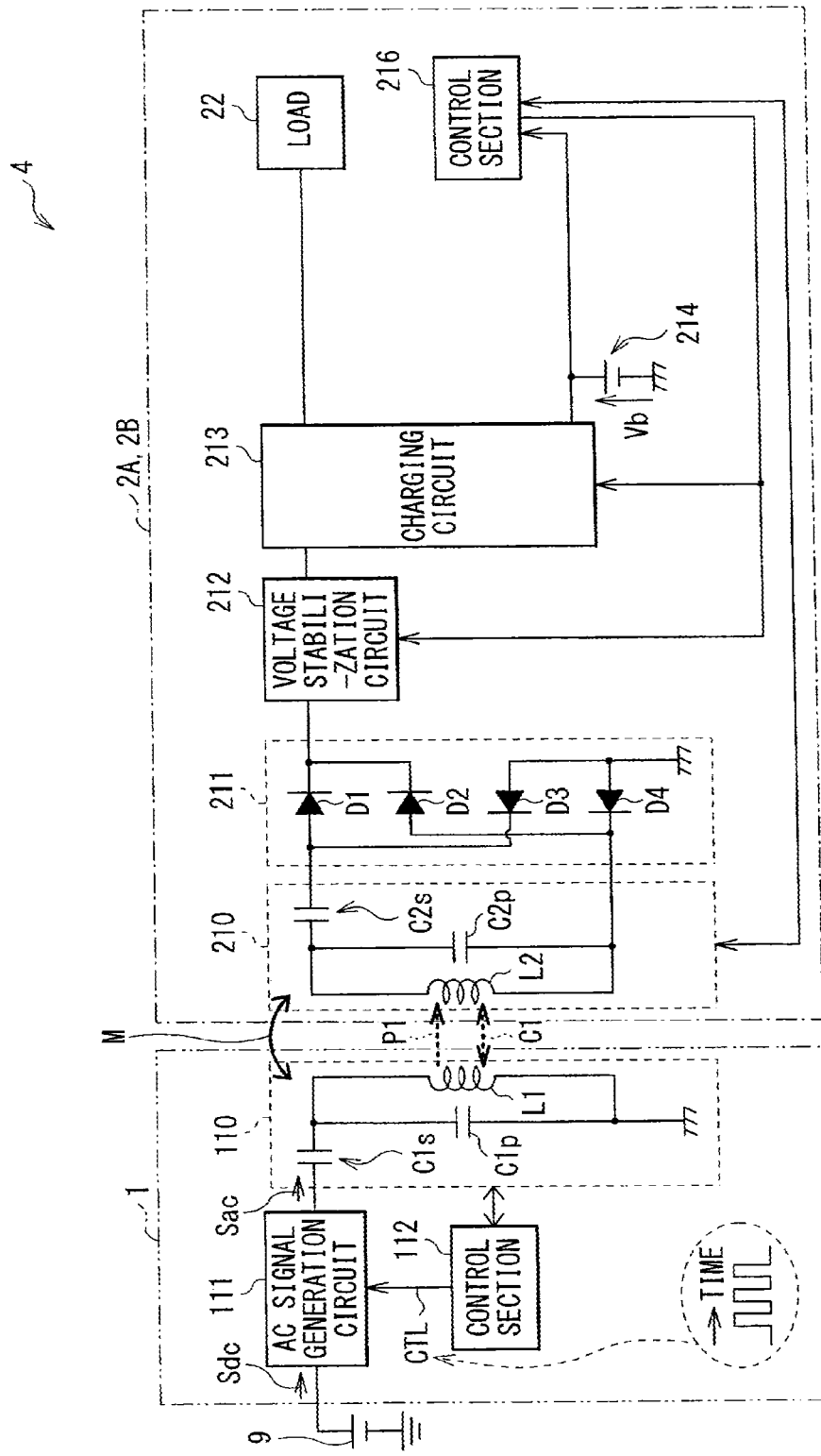
[FIG. 3]

[ FIG. 4 ]
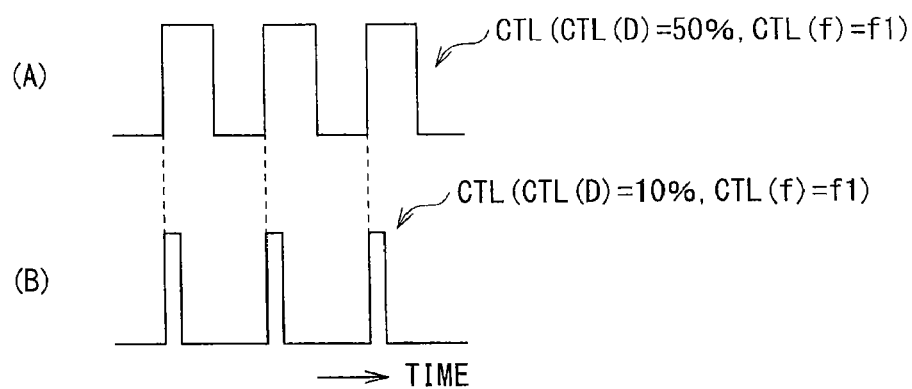
[ FIG. 5 ]
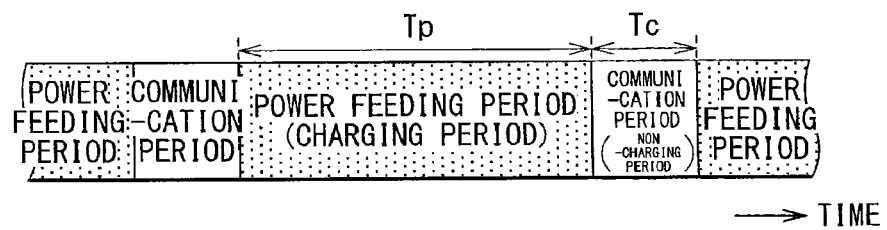

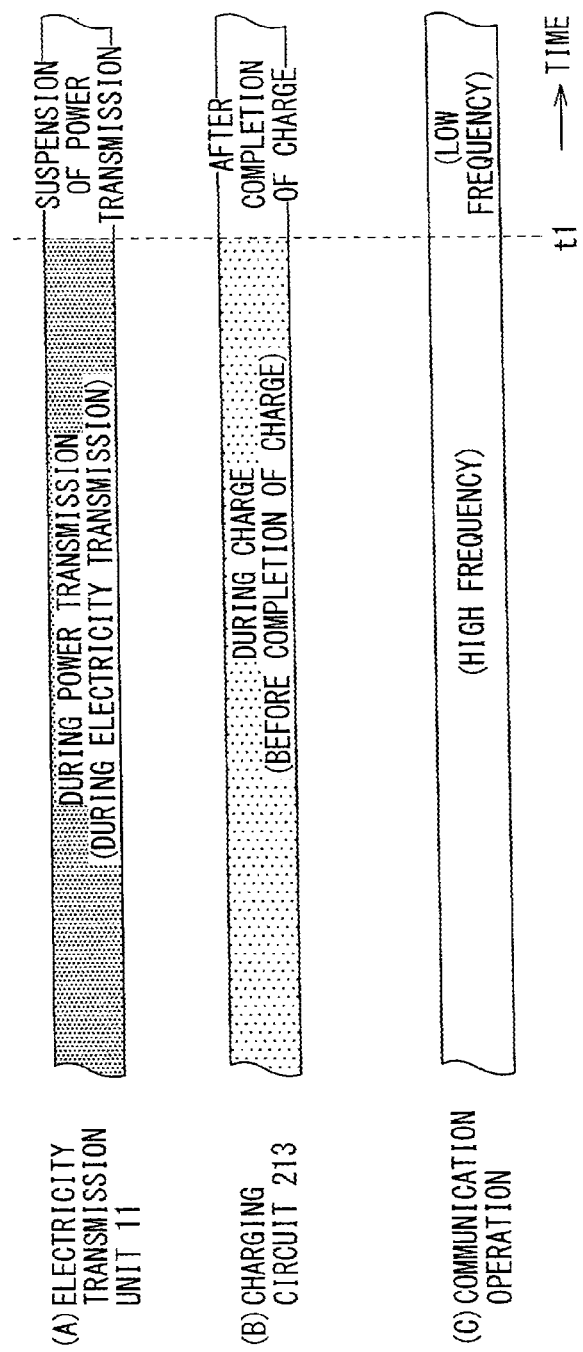
[FIG. 6]

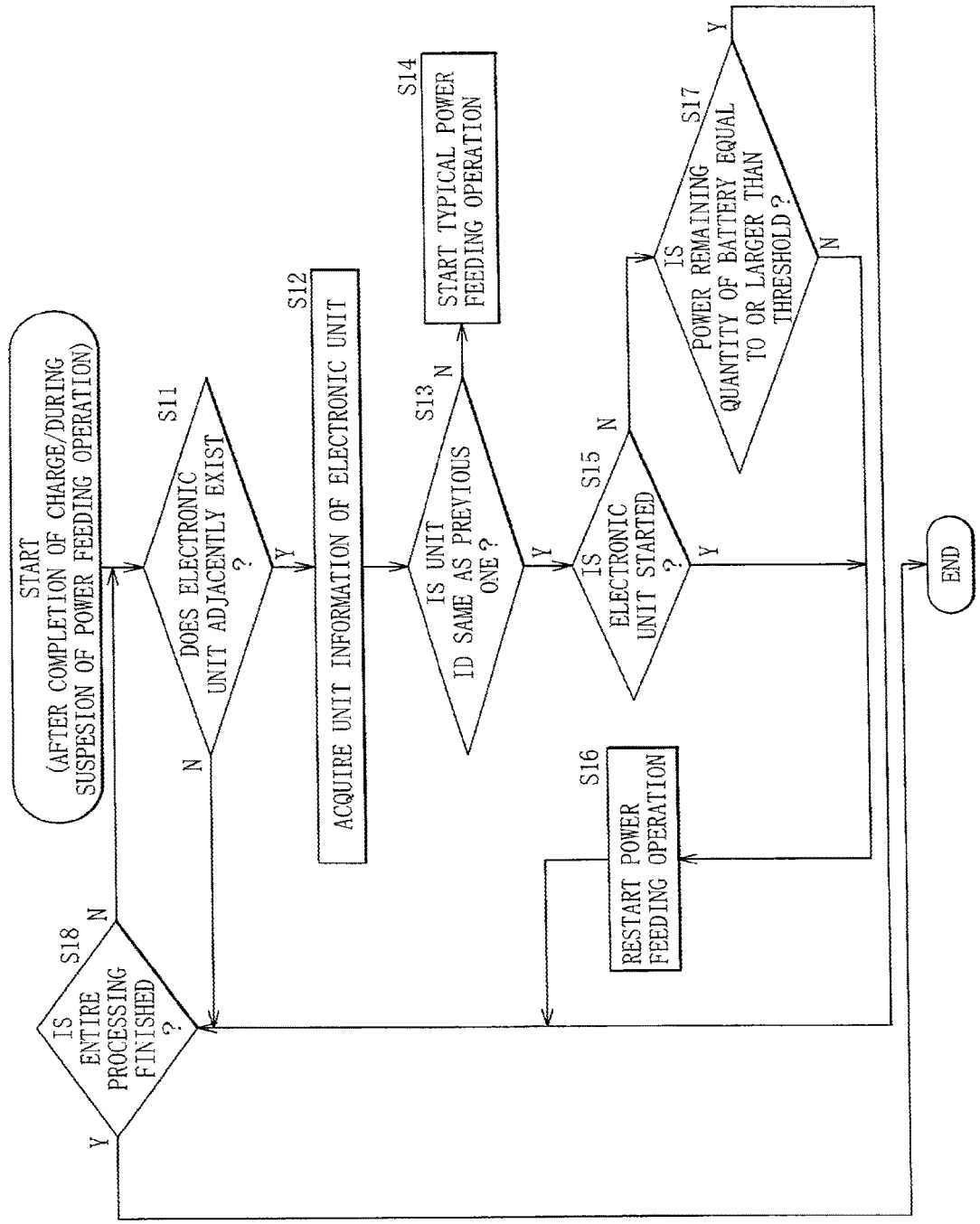
[FIG. 7]

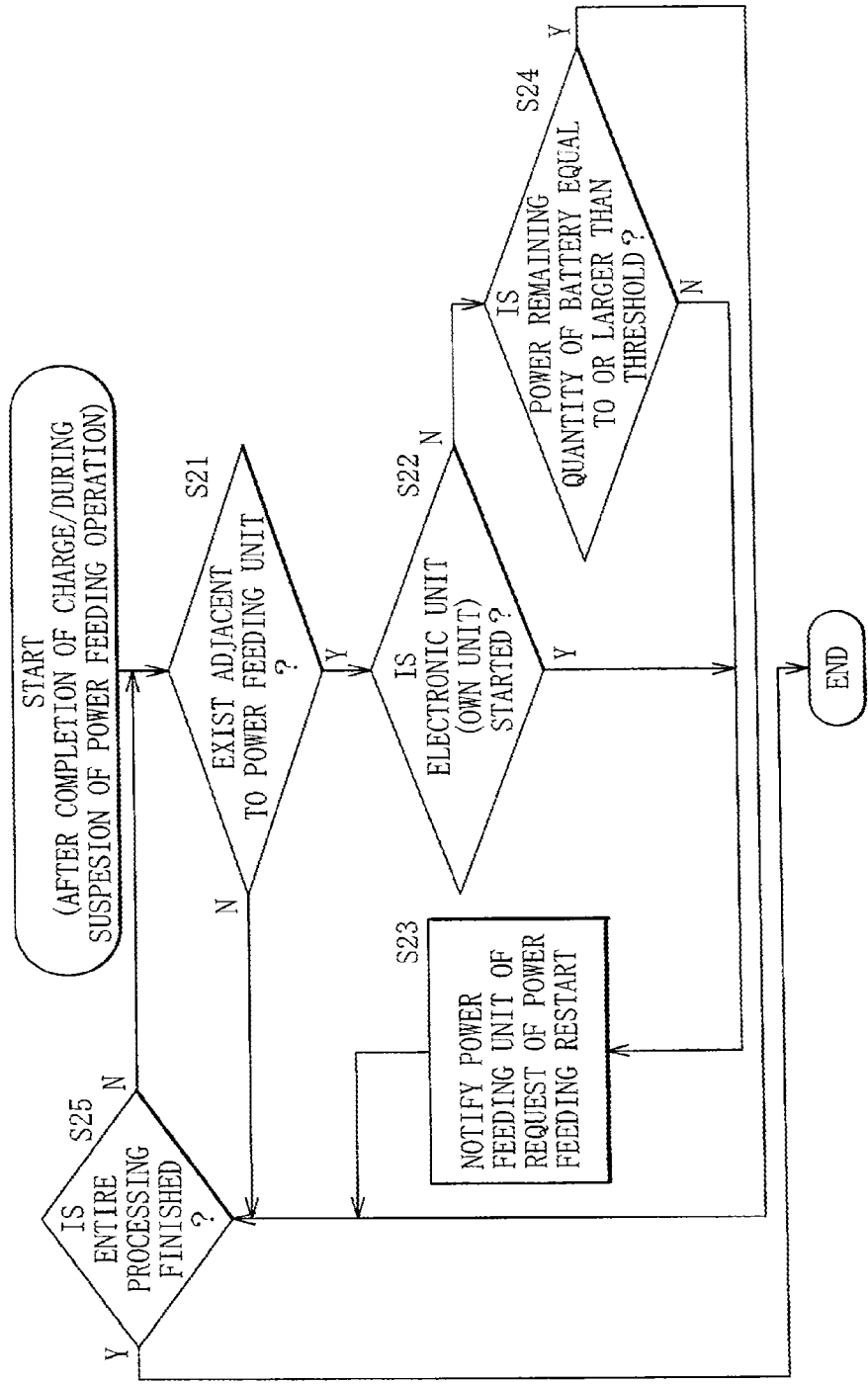

[ FIG. 9 ]
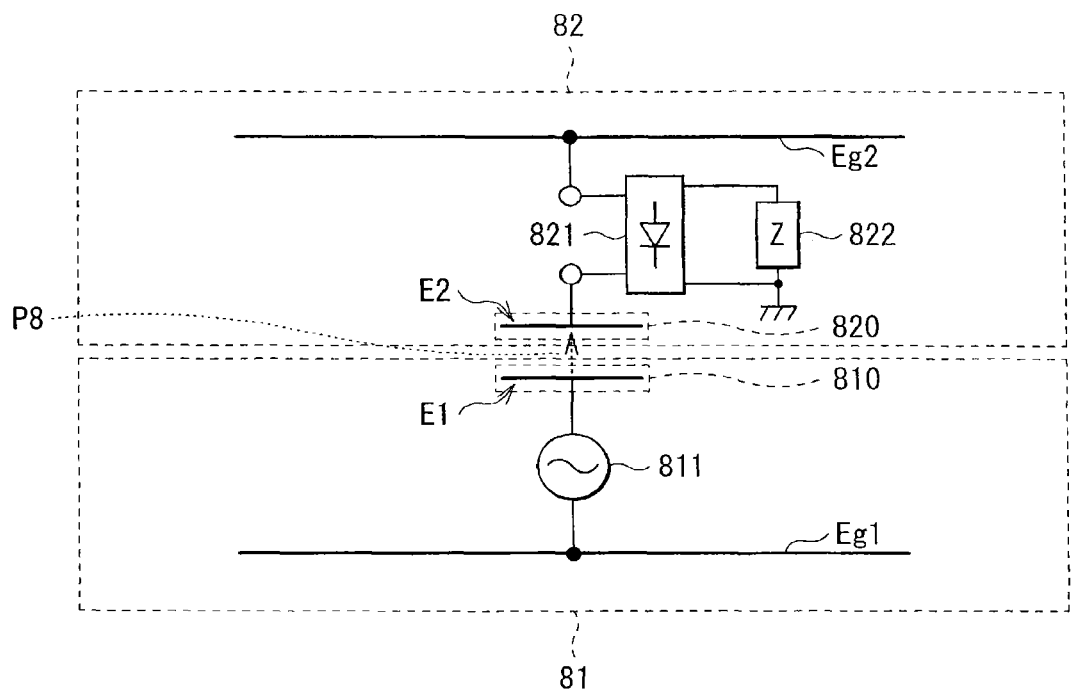
[ FIG. 10 ]
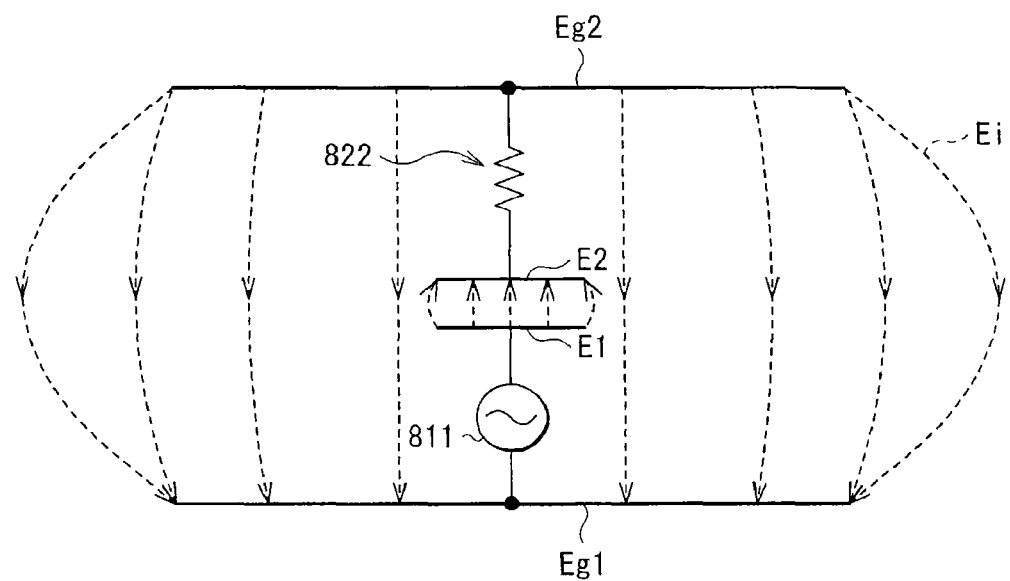

POWER FEEDING UNIT, POWER FEEDING SYSTEM, AND ELECTRONIC UNIT

CROSS-REFERENCE TO RELATED APPLICATIONS

This application is a continuation application of and claims the benefit of priority under 35 U.S.C. § 120 from U.S. application Ser. No. 14/357,840, filed May 13, 2014. U.S. application Ser. No. 14/357,840 is a national stage of international application PCT/JP12/82008, filed Dec. 11, 2012, which claims the priority benefit of Japanese Patent Application JP 2011-279238 filed in the Japan Patent Office on Dec. 21, 2011 and Japanese Patent Application JP 2012-93835 filed in the Japan Patent Office on Apr. 17, 2012, the entire content of each of which is incorporated herein by reference.

It should be understood by those skilled in the art that various modifications, combinations, sub-combinations and alterations may occur depending on design requirements and other factors insofar as they are within the scope of the appended claims or the equivalents thereof.

TECHNICAL FIELD

The present disclosure relates to a power feeding system that performs power supply (electricity transmission, or power transmission) in a noncontact manner to a power-feeding objective unit such as an electronic unit, and relates to a power feeding unit and an electronic unit applicable to such a power feeding system.

BACKGROUND ART

Recently, attention has been focused on a power feeding system (a noncontact power feeding system or a wireless charging system) that performs power supply (electricity transmission, or power transmission) in a noncontact manner to CE devices (Consumer Electronics Devices) such as a mobile phone and a portable music player. Such a noncontact power feeding system makes it possible to start charge only by placing an electronic unit (a secondary unit) on a charging tray (a primary unit) instead of inserting (connecting) a connector, such as an AC adaptor, of a power supply unit into a unit. In other words, terminal connection between the electronic unit and the charging tray is not necessary.

An electromagnetic induction method is well known as a method of performing power supply in such a noncontact manner. Recently, attention is further focused on a noncontact power feeding system adopting a method referred to as magnetic resonance method using an electromagnetic resonant phenomenon. For example, PTL 1 to PTL 6 each disclose such a noncontact power feeding system.

CITATION LIST

Patent Literature

Patent Literature 1: JP2001-102974A
Patent Literature 2: WO00-27531A
Patent Literature 3: JP2008-206233A
Patent Literature 4: JP2002-34169A
Patent Literature 5: JP2005-110399A
Patent Literature 6: JP2010-63245A

SUMMARY OF INVENTION

In the noncontact power feeding system as described above, it is generally required to appropriately control charge of a battery (secondary battery) in a power-feeding objective unit such as an electronic unit to improve user convenience.

It is therefore desirable to provide a power feeding unit, a power feeding system, and an electronic unit capable of improving user convenience during power transmission (electricity transmission) using one of a magnetic field and an electric field.

A power feeding unit of an embodiment of the present disclosure includes: an electricity transmission section configured to perform electricity transmission using one of a magnetic field and an electric field to a power-feeding objective unit having a secondary battery; and an electricity transmission control section configured to control electricity transmission operation of the electricity transmission section. The electricity transmission control section allows the electricity transmission operation to be suspended when charge of the secondary battery is completed based on power provided through the electricity transmission, and allows the electricity transmission operation to be restarted when a predetermined condition is satisfied after completion of the charge.

A power feeding system of an embodiment of the present disclosure includes: one or more electronic units (power-feeding objective units) each having a secondary battery; and the power feeding unit according to the above-described embodiment of the present disclosure, which is configured to transmit electricity to the one or more electronic units using one of a magnetic field and an electric field.

In the power feeding unit and the power feeding system according to the embodiments of the present disclosure, electricity transmission operation of the electricity transmission section is controlled such that when charge of the secondary battery in the power-feeding objective unit is completed based on power provided through electricity transmission using one of a magnetic field and an electric field, the electricity transmission operation is suspended, and when a predetermined condition is satisfied after completion of the charge, the electricity transmission operation is restarted. Consequently, even after charge is completed and the electricity transmission operation is suspended, opportunity of restart of the electricity transmission operation (opportunity of recharge of the secondary battery) is secured.

An electronic unit of an embodiment of the present disclosure includes: an electricity reception section configured to receive power from a power feeding unit, the power being provided through electricity transmission using one of a magnetic field and an electric field; a secondary battery configured to be charged based on the power received by the electricity reception section; and a control section configured to perform predetermined control. When charge of the secondary battery is completed and the electricity transmission is suspended, and when a predetermined condition is satisfied, the control section notifies the power feeding unit of request of electricity transmission restart.

In the electronic unit according to the embodiment of the present disclosure, when charge of the secondary battery is completed based on power provided through electricity transmission using one of a magnetic field and an electric field and the electricity transmission operation is suspended, and when a predetermined condition is satisfied, the power feeding unit is notified of request of electricity transmission restart. Consequently, even after charge is completed and electricity transmission (electricity transmission operation) is suspended, the power feeding unit is prompted to restart electricity transmission operation; hence, opportunity of restart of electricity transmission operation (opportunity of recharge of the secondary battery) is easily secured.

According to the power feeding unit and the power feeding system of the embodiments of the present disclosure, when charge of the secondary battery in the power-feeding objective unit is completed based on power provided through electricity transmission using one of a magnetic field and an electric field, the electricity transmission operation is suspended, and when a predetermined condition is satisfied after completion of the charge, the electricity transmission operation is restarted. Hence, even after the charge is completed and the electricity transmission operation is suspended, it is possible to secure opportunity of restart of the electricity transmission operation. Consequently, it is possible to improve user convenience during power transmission using one of a magnetic field and an electric field.

According to the electronic unit of the embodiment of the present disclosure, when charge of the secondary battery is completed based on power provided through electricity transmission using one of a magnetic field and an electric field and electricity transmission operation is suspended, and when a predetermined condition is satisfied, the power feeding unit is notified of request of restart of the electricity transmission. Hence, even after charge is completed and electricity transmission (electricity transmission operation) is suspended, opportunity of restart of the electricity transmission operation is easily secured. Consequently, it is possible to improve user convenience during power transmission using one of a magnetic field and an electric field.

BRIEF DESCRIPTION OF DRAWINGS

FIG. 1 is a perspective diagram illustrating an exemplary appearance configuration of a power feeding system according to one embodiment of the present disclosure.

FIG. 2 is a block diagram illustrating an exemplary detailed configuration of the power feeding system illustrated in FIG. 1.

FIG. 3 is a circuit diagram illustrating an exemplary detailed configuration of each of blocks illustrated in FIG. 2.

FIG. 4 includes timing waveform diagrams illustrating an exemplary control signal for an AC signal generation circuit.

FIG. 5 is a timing diagram illustrating an example of each of a power feeding period and a communication period.

FIG. 6 is a timing diagram illustrating each of exemplary operation states before and after completion of charge in the power feeding system illustrated in FIG. 3.

FIG. 7 is a flowchart illustrating an example of electricity transmission restart control according to the embodiment.

FIG. 8 is a flowchart illustrating an example of request processing of electricity transmission restart according to a modification.

FIG. 9 is a block diagram illustrating an exemplary schematic configuration of a power feeding system according to another modification.

FIG. 10 is a schematic diagram illustrating an exemplary transmission mode of an electric field in the power feeding system illustrated in FIG. 9.

DESCRIPTION OF EMBODIMENT

Hereinafter, an embodiment of the present disclosure is described in detail with reference to the accompanying drawings. It is to be noted that description is made in the following order.

1. Embodiment (an example of performing determination on electricity transmission restart by a control section in a power feeding unit).
2. Modification (an example of performing determination on request of electricity transmission restart by a control section in an electronic unit).
3. Other Modifications (an example of performing power transmission in a noncontact manner using an electric field, and the like).

Embodiment

Overall Configuration of Power Feeding System 4

FIG. 1 illustrates an exemplary appearance configuration of a power feeding system (power feeding system 4) according to an embodiment of the present disclosure. FIG. 2 illustrates an exemplary block configuration of the power feeding system 4. The power feeding system 4 is a system (noncontact power feeding system) that performs power transmission (power supply, power feeding, or electricity transmission) in a noncontact manner using a magnetic field (using magnetic resonance, electromagnetic induction, or the like; the same holds true hereinafter). The power feeding system 4 includes a power feeding unit 1 (primary unit) and one or more electronic units (in this exemplary case, two electronic units 2A and 2B, or secondary units) as power-feeding objective units.

In the power feeding system 4, for example, as illustrated in FIG. 1, the electronic units 2A and 2B are placed on (or disposed close to) a power feeding surface (an electricity transmission surface) S1 of the power feeding unit 1, thereby power transmission is performed from the power feeding unit 1 to the electronic unit 2A or 2B. In this exemplary case, in consideration of a case where power transmission is performed to the plurality of electronic units 2A and 2B in a simultaneous or time-divisional (sequential) manner, the power feeding unit 1 is in a mat shape (tray shape), in which area of the power feeding surface S1 is larger than total area of the electronic units 2A and 2B as a power feeding object.

(Power Feeding Unit 1)

As described above, the power feeding unit 1 is a unit (charging tray) configured to perform power transmission (electricity transmission) to the electronic unit 2A or 2B using a magnetic field. For example, as illustrated in FIG. 2, the power feeding unit 1 includes an electricity transmission unit 11 including an electricity transmission section 110, an AC signal generation circuit (a high-frequency power generation circuit) 111, and a control section 112 (electricity transmission control section).

The electricity transmission section 110 includes an electricity transmission coil (a primary coil) L1, capacitors $C1p$ and $C1s$ (resonance capacitors), etc. as described later. The electricity transmission section 110 uses the electricity transmission coil L1 and the capacitors $C1p$ and $C1s$ to perform power transmission (electricity transmission) to the electronic unit 2A or 2B (in detail, an electricity reception section 210 described later) using an AC magnetic field (see an arrow P1 in FIG. 2). Specifically, the electricity transmission section 110 has a function of radiating a magnetic field (magnetic flux) from the power feeding surface S1 to the electronic unit 2A or 2B. The electricity transmission section 110 further has a function of performing predetermined intercommunication operation with the electricity reception section 210 described later (see an arrow C1 in FIG. 2).

For example, the AC signal generation circuit 111 is a circuit configured to generate a predetermined AC signal Sac (high-frequency power) for performing electricity transmission using power supplied from an external power supply 9 (a parent power supply) of the power feeding unit 1. For example, such an AC signal generation circuit 111 is configured of a switching amplifier described later. Examples of the external power supply 9 include a power supply (power supply capacity: 500 mA, source voltage: about 5 V) of USB (Universal Serial Bus) 2.0 provided in PC (Personal Computer).

The control section 112 is configured to perform various types of control operation of the power feeding unit 1 as a whole (the power feeding system 4 as a whole). Specifically, the control section 112 has a function of controlling electricity transmission (electricity transmission operation) and communication (communication operation) performed by the electricity transmission section 110, and further has, for example, a function of performing optimization control of power to be fed, a function of authenticating the secondary units, a function of determining that the secondary units are located on the primary unit, and a function of detecting contamination of a dissimilar metal, etc. In the above-described control of electricity transmission, the control section 112 uses a predetermined control signal CTL (a control signal for electricity transmission) described later to control operation of the AC signal generation circuit 111. The control section 112 further has a function of performing modulation processing with pulse width modulation (PWM) described later using the control signal CTL.

In this embodiment, the control section 112 has a function of allowing electricity transmission operation of the electricity transmission section 110 to be suspended when charge of a battery 214 described later in the electronic unit 2A or 2B is completed based on power transmitted using a magnetic field. The control section 112 further has a function of allowing electricity transmission operation of the electricity transmission section 110 to be restarted (performing control of electricity transmission restart) when a predetermined condition described later is satisfied even after completion of such charge. In particular, in this embodiment, the control section 112 determines whether or not the above-described condition is satisfied based on examination by the control section 112 itself (using various determination results described later). It is to be noted that the electricity transmission restart control (power feeding restart control) by the control section 112 is described in detail later (FIG. 7).

(Electronic Units 2A and 2B)

For example, the electronic units 2A and 2B are each a standalone electronic unit typified by a television receiver, a portable electronic unit having a rechargeable battery (a battery) typified by a mobile phone and a digital camera. For example, as illustrated in FIG. 2, the electronic units 2A and 2B each include an electricity reception unit 21, and a load 22 that performs predetermined operation, the operation allowing the electronic units to exhibit their functions, based on the power supplied from the electricity reception unit 21. The electricity reception unit 21 includes the electricity reception section 210, a rectifier circuit 211, a voltage stabilization circuit 212, a charging circuit 213 (a charging section), a battery 214 (a secondary battery), and a control section 216.

The electricity reception section 210 includes an electricity reception coil (secondary coil) L2, capacitors C2$p$ and C2$s$ (resonance capacitors), etc., as described later. The electricity reception section 210 has a function of receiving power transmitted (sent) from the electricity transmission section 110 in the power feeding unit 1 using the electricity reception coil L2, the capacitors C2$p$ and C2$s$, etc. Also, the electricity reception section 210 has the above-described function of performing predetermined intercommunication operation with the electricity transmission section 110 (see the arrow C1 in FIG. 2).

The rectifier circuit 211 is a circuit configured to rectify the power (AC power) supplied from the electricity reception section 210 to generate DC power.

The voltage stabilization circuit 212 is a circuit configured to perform predetermined voltage stabilization operation based on the DC power supplied from the rectifier circuit 211.

The charging circuit 213 is a circuit configured to charge the battery 214 based on the DC power subjected to voltage stabilization supplied from the voltage stabilization circuit 212.

The battery 214 stores power in correspondence to charge by the charging circuit 213, and is configured of, for example, a rechargeable battery (secondary battery) such as a lithium ion battery.

The control section 216 is configured to perform various types of control operation of the electronic units 2A and 2B as a whole (the power feeding system 4 as a whole). Specifically, the control section 216 has a function of controlling electricity reception operation and communication operation of the electricity reception section 110, and a function of controlling operation of each of the voltage stabilization circuit 212, the charging circuit 213, and the like. It is to be noted that the functions of the control section 216 are described in detail later.

[Detailed Configuration of each of Power Feeding Unit 1 and Electronic Units 2A and 2B]

FIG. 3 is a circuit diagram illustrating an exemplary detailed configuration of each of blocks in the power feeding unit 1 and in the electronic units 2A and 2B illustrated in FIG. 2.

(Electricity Transmission Section 110)

The electricity transmission section 110 includes the electricity transmission coil L1 for performing power transmission using a magnetic field (for generating magnetic flux), and the capacitors C1$p$ and C1$s$ for forming an LC resonance circuit together with the electricity transmission coil L1. The capacitor C1$s$ is electrically connected in series to the electricity transmission coil L1. Specifically, a first end of the capacitor C1$s$ is connected to a first end of the electricity transmission coil L1. Moreover, a second end of the capacitor C1$s$ and a second end of the electricity transmission coil L1 are connected in parallel to the capacitor C1$p$, and a connection end between the electricity transmission coil L1 and the capacitor C1$p$ is grounded.

The LC resonance circuit configured of the electricity transmission coil L1 and the capacitors C1$p$ and C1$s$ is magnetically coupled with an LC resonance circuit configured of a electricity reception coil L2 and capacitors C2$p$ and C2$s$ described later. Consequently, LC resonance operation is performed at a resonance frequency substantially equal to a frequency of high-frequency power (an AC signal Sac) generated by the AC signal generation circuit 111 described later.

(AC Signal Generation Circuit 111)

The AC signal generation circuit 111 is configured of a switching amplifier (so-called a class E amplifier) having one transistor (not shown) as a switching element. The AC signal generation circuit 111 is configured to receive a control signal CTL for electricity transmission from the control section 112. As illustrated in FIG. 3, the control signal CTL is a pulse signal having a predetermined duty ratio. In addition, for example, as illustrated in FIGS. 4(A) and 4(B), pulse width modulation described later is performed through control of the duty ratio of the control signal CTL.

According to such a configuration, in the AC signal generation circuit 111, the above-described transistor performs ON/OFF operation (switching operation at a predetermined frequency and with a predetermined duty ratio) in accordance with the control signal CTL for electricity transmission. Specifically, ON/OFF operation of the transistor as the switching element is controlled using the control signal CTL supplied from the control section 112. Consequently, for example, the AC signal Sac (AC power) is generated based on a DC signal Sdc received from the external power supply 9, and is supplied to the electricity transmission section 110.

(Electricity Reception Section 210)

The electricity reception section 210 includes an electricity reception coil L2 for receiving power (from the magnetic flux) transmitted from the electricity transmission section 110, and capacitors C2p and C2s for forming an LC resonance circuit together with the electricity reception coil L2. The capacitor C2p is electrically connected in parallel to the electricity reception coil L2, while the capacitor C2s is electrically connected in series to the electricity reception coil L2. Specifically, a first end of the capacitor C2s is connected to a first end of the capacitor C2p and to a first end of the electricity reception coil L2. Moreover, a second end of the capacitor C2s is connected to a first input terminal of the rectifier circuit 211, while a second end of the electricity reception coil L2 and a second end of the capacitor C2p are each connected to a second input terminal of the rectifier circuit 211.

The LC resonance circuit configured of the electricity reception coil L2 and the capacitors C2p and C2s is magnetically coupled with the LC resonance circuit configured of the electricity transmission coil L1 and the capacitors C1p and C1s described above. Consequently, LC resonance operation is performed at a resonance frequency that is substantially equal to a frequency of the high-frequency power (AC signal Sac) generated by the AC signal generation circuit 111.

(Rectifier Circuit 211)

In this exemplary case, the rectifier circuit 211 is configured of four rectifier elements (diodes) D1 to D4. Specifically, an anode of the rectifier element D1 and a cathode of the rectifier element D3 are each connected to the first input terminal of the rectifier circuit 211. A cathode of the rectifier element D1 and a cathode of the rectifier element D2 are each connected to an output terminal of the rectifier circuit 211. An anode of the rectifier element D2 and a cathode of the rectifier element D4 are each connected to the second input terminal of the rectifier circuit 211. An anode of the rectifier element D3 and an anode of the rectifier element D4 are each grounded. According to such a configuration, the rectifier circuit 211 rectifies the AC power supplied from the electricity reception section 210, and supplies incoming power as the DC power to the voltage stabilization circuit 212.

(Charging Circuit 213)

The charging circuit 213 is a circuit configured to charge the battery 214 as described above based on the DC power (incoming power) subjected to voltage stabilization. In this exemplary case, the charging circuit 213 is disposed between the voltage stabilization circuit 212 and the load 22.

(Control Section 216)

As described above, the control section 216 performs various types of control operation of the electronic units 2A and 2B as a whole (the power feeding system 4 as a whole). In particular, in this embodiment, the control section 216 has the following function. Specifically, the control section 216 has a function of acquiring and grasping various types of unit information of its own unit (the electronic unit 2A or 2B) at any time, and supplying such unit information to the power feeding unit 1 (the control section 112) through communication using the electricity reception section 210. As described in detail later, such unit information includes unit ID (identification information) for identifying the own unit, start situation information indicating a start situation of the own unit, power remaining quantity information (for example, battery voltage Vb illustrated in FIG. 3) indicating power remaining quantity of the battery 214, and the like.

[Functions and Effects of Power Feeding System 4]

(1. Summary of Overall Operation)

In the power feeding system 4, the AC signal generation circuit 111 in the power feeding unit 1 supplies the predetermined high-frequency power (the AC signal Sac) for power transmission to the electricity transmission coil L1 and the capacitors C1p and C1s (the LC resonance circuit) in the electricity transmission section 110, based on the power supplied from the external power supply 9. Consequently, the electricity transmission coil L1 in the electricity transmission section 110 generates a magnetic field (magnetic flux). At this time, when the electronic units 2A and 2B as power-feeding objective units (charging objective units) are placed on (or disposed close to) a top (the power feeding surface S1) of the power feeding unit 1, the electricity transmission coil L1 in the power feeding unit 1 becomes proximate to the electricity reception coil L2 in the electronic unit 2A or 2B in the vicinity of the power feeding surface S1.

In this way, when the electricity reception coil L2 is disposed close to the electricity transmission coil L1 generating a magnetic field (magnetic flux), electromotive force is induced in the electricity reception coil L2 by the magnetic flux generated from the electricity transmission coil L1. In other words, the magnetic field is generated by electromagnetic induction or magnetic resonance while interlinking with each of the electricity transmission coil L1 and the electricity reception coil L2. Consequently, power transmission is performed from an electricity transmission coil L1 side (the primary side, a power feeding unit 1 side, or an electricity transmission section 110 side) to an electricity reception coil L2 side (the secondary side, an electronic units 2A and 2B side, or an electricity reception section 210 side) (see the arrow P1 in FIGS. 2 and 3). At this time, the electricity transmission coil L1 in the power feeding unit 1 is magnetically coupled with the electricity reception coil L2 in the electronic unit 2A or 2B, so that the LC resonance circuit performs LC resonance operation.

In the electronic unit 2A or 2B, the AC power received by the electricity reception coil L2 is therefore supplied to the rectifier circuit 211, the voltage stabilization circuit 212, and the charging circuit 213, and the following charging operation is performed. Specifically, the AC power is converted into a predetermined DC power by the rectifier circuit 211, and the DC power is voltage-stabilized by the voltage stabilization circuit 212, and then the charging circuit 213 charges the battery 214 based on the DC power. In this way, the electronic unit 2A or 2B performs charging operation based on the power received by the electricity reception section 210.

In other words, in this embodiment, for example, terminal connection to an AC adaptor or the like is not necessary for charge of the electronic unit 2A or 2B, and thus charge is allowed to be easily started (noncontact power feeding is performed) only by placing the electronic units 2A and 2B on (or disposing the electronic units 2A and 2B close to) the power feeding surface S1 of the power feeding unit 1. This leads to reduced burden of a user.

For example, as illustrated in FIG. 5, in such power feeding operation, a power feeding period Tp (charging period of the battery 214) and a communication period Tc (non-charging period) are periodically (or non-periodically) provided in a time-divisional manner. In other words, the control sections 112 and 216 control the power feeding period Tp and the communication period Tc to be periodically (or non-periodically) set in a time-divisional manner. The communication period Tc is a period during which intercommunication operation using the electricity transmission coil L1 and the electricity reception coil L2 (intercommunication operation for authentication of respective units, control of power feeding efficiency, and the like) is performed between the primary unit (power feeding unit 1) and the secondary unit (electronic unit 2A or 2B) (see the arrow C1 in FIGS. 2 and 3). In this exemplary case, a time ratio of the power feeding period Tp to the communication period Tc is, for example, power feeding period Tp/communication period Tc=about 9/1.

In the communication period Tc, for example, communication operation is performed with pulse width modulation defined by the AC signal generation circuit 111. Specifically, communication is performed with the pulse width modulation through setting of a duty ratio of the control signal CTL in the communication period Tc based on predetermined modulation data. It is in principle difficult to perform frequency modulation during the above-described resonance operation of the electricity transmission section 110 and the electricity reception section 210. Communication operation is therefore easily achieved using such pulse width modulation.

(2. Operation States Before and after Completion of Charge)

Moreover, in the power feeding system 4 of this embodiment, when charge of the battery 214 in the electronic unit 2A or 2B is completed (after charge is completed) based on power provided through electricity transmission using a magnetic field as described above, electricity transmission operation of the electricity transmission section 110 is suspended. In other words, after completion of such charge, the control section 112 in the power feeding unit 1 controls such that electricity transmission operation of the electricity transmission section 110 is suspended.

FIG. 6 is a timing diagram illustrating each of exemplary operation states before and after completion of charge in the power feeding system 4. In FIG. 6, (A) illustrates an operation state of the electricity transmission unit 11, (B) illustrates an operation state of the charging circuit 213, and (C) illustrates a state of communication operation between the power feeding unit 1 and the electronic unit 2A or 2B.

First, in a period (a period before timing t1) before completion of charge (during charge), the charging circuit 213 performs charge of the battery 214 based on electricity transmission, which is performed using a magnetic field by the electricity transmission unit 11, as described hereinbefore. In addition, in the period before completion of charge, the above-described communication between the power feeding unit 1 and the electronic unit 2A or 2B is performed at a higher frequency than in a period after completion of charge described below.

Subsequently, in a period (a period after timing t1) after completion of such charge, as described above, the control section 112 in the power feeding unit 1 controls such that electricity transmission operation of the electricity transmission unit 11 (electricity transmission section 110) is suspended. This prevents useless (unnecessary) electricity transmission to the power-feeding objective unit (the electronic unit 2A or 2B) (useless charge of the power-feeding objective unit), and avoids heat generation or the like caused by excessive electricity transmission power.

Moreover, in this exemplary case, communication operation (a communication period Tc) is also continuously set in the period after completion of the charge (see (C) of FIG. 6). Consequently, such communication operation is still periodically performed after completion of the charge, thereby it is possible that the power feeding unit 1 and the electronic unit 2A or 2B mutually grasp operation states in the power feeding system 4 (respective unit states of the power feeding unit 1 and the electronic unit 2A or 2B), and each make an appropriate response corresponding thereto.

Furthermore, for example, as illustrated in (C) of FIG. 6, communication between the power feeding unit 1 and the electronic unit 2A or 2B is desirably set to be performed at a lower frequency in the period after completion of charge than in the period before completion of charge. This is because it is expected that necessity of frequently grasping the mutual unit states is not so high in the period after completion of charge.

Thus, in the power feeding system 4, electricity transmission operation of the electricity transmission section 110 is suspended after completion of charge of the battery 214. However, even after completion of the charge, for example, a case where the electronic unit 2A or 2B in a fully charged state is started (automatically started by a timer, etc., manually started by a user, or the like), or a case where power remaining quantity (battery voltage Vb) of the battery 214 is decreased due to natural discharge or the like is considered. In such a case, if the electricity transmission operation is still suspended (is still not recharged), the power remaining quantity of the battery 214 is persistently decreased, leading to reduction in user convenience.

(3. Electricity Transmission Restart Control)

In the power feeding system 4 of this embodiment, therefore, when a predetermined condition (a condition of electricity transmission restart) is satisfied even after completion of the charge, the control section 112 in the power feeding unit 1 performs control (electricity transmission restart control) to allow the electricity transmission operation of the electricity transmission section 110 to be restarted. The electricity transmission restart control by the control section 112 is described in detail below.

FIG. 7 is a flowchart illustrating an example of electricity transmission restart control of this embodiment, in which the operation state after completion of charge of the battery 214 (during suspension of power feeding operation) is assumed as a start point (start state). In the electricity transmission restart control, first, the control section 112 determines whether or not the power-feeding objective unit (in this exemplary case, the electronic unit 2A or 2B) adjacently exists (is located on the electricity transmission surface S1) using intercommunication with the electronic unit 2A or 2B (step S11 of FIG. 7). Specifically, first, the control section 112 performs determination on restart of electricity transmission operation based on the determination result on whether the power-feeding objective unit adjacently exists or not.

When the power-feeding objective unit is determined not to adjacently exist (step S11: N), the control section 112 determines that the condition of electricity transmission restart is not satisfied since the power-feeding objective unit does not originally exist. In this case, therefore, the electricity transmission operation is not restarted, and the process is advanced to step S18 described later.

On the other hand, when the power-feeding objective unit is determined to adjacently exist (step S11: Y), the control section 112 acquires unit information on that power-feeding objective unit using the above-described communication or the like (step S12). In this exemplary case, as described above, unit ID (identification information) for identifying its own unit, start situation information indicating a start situation of the own unit, power remaining quantity information (in this exemplary case, the battery voltage Vb) indicating power remaining quantity of the battery 214 are used as such unit information. In this way, when the power-feeding objective unit is determined to adjacently exist, the control section 112 acquires the unit information on that power-feeding objective unit, and performs determination on restart of electricity transmission operation based on the unit information.

Subsequently, the control section 112 uses the unit ID as the unit information to determine whether a power-feeding objective unit that adjacently exist at present is the same unit as a power-feeding objective unit (in this exemplary case, the electronic unit 2A or 2B) of which the charge is completed (step S13). Specifically, the control section 112 performs determination on restart of electricity transmission operation based on the determination result on such identity of the power-feeding objective unit.

When the power-feeding objective unit is determined not to be the same unit (step S11: N), the control section 112 controls the electricity transmission section 110 such that electricity transmission operation is newly started to a power-feeding objective unit that adjacently exists at present (a unit different from the unit of which the charge is completed). In other words, the control section 112 controls such that a sequence of typical power feeding operation (charging operation) is started for such a different unit (step S14). On the other hand, when that power-feeding objective unit is determined to be the same unit (step S11: Y), the control section 112 then uses one or both of the start situation information and the power remaining quantity information to make determination on restart of the electricity transmission operation. In this exemplary case, for instance, as described below, the control section 112 uses both the start situation information and the power remaining quantity information to make determination on restart of the electricity transmission operation (steps S15 and S17).

Specifically, first, the control section 112 determines whether the power-feeding objective unit (in this exemplary case, the electronic unit 2A or 2B) is started or not (is in an activated state or not) based on the start situation information (step S15). When the power-feeding objective unit is determined to be started (step S15: Y), the control section 112 determines that the condition of electricity transmission restart is satisfied since the power remaining quantity of the battery 214 is decreased in the activated state, and allows the electricity transmission operation to be restarted (step S16). Consequently, the electricity transmission operation of the electricity transmission section 110 is restarted, and the battery 214 in the electronic unit 2A or 2B is recharged. It is to be noted that after electricity transmission operation is restarted in this way, the process is advanced to step S18 described later.

On the other hand, when the power-feeding objective unit is determined not to be started (step S15: N), the control section 112 determines whether or not the power remaining quantity of the battery 214 is equal to or larger than a predetermined threshold based on the power remaining quantity information (step S17). Specifically, in this exemplary case, the control section 112 determines whether or not the battery voltage Vb is equal to or higher than a predetermined threshold Vth.

When the battery voltage Vb is determined to be lower than the threshold Vth (step S17: N), the control section 112 determines that the condition of electricity transmission restart is satisfied since the power remaining quantity of the battery 214 is small (insufficient), and allows the electricity transmission operation to be restarted (step S16). Consequently, in this case, the electricity transmission operation of the electricity transmission section 110 is also restarted, and the battery 214 in the electronic unit 2A or 2B is also recharged.

On the other hand, when the battery voltage Vb is determined to be equal to or higher than the threshold voltage Vth (step S17: Y), the control section 112 determines that the condition of electricity transmission restart is not satisfied since the electronic unit 2A or 2B is not started and the power remaining quantity of the battery 214 is sufficient. In other words, in this case, the control section 112 determines that recharge of the battery 214 is unnecessary. Hence, in this case, the electricity transmission operation is not restarted, and the process is advanced to step S18 described later.

In this way, in this exemplary case, when the power-feeding objective unit is determined not to be started (step S15: N), and when the power remaining quantity is determined to be equal to or larger than the predetermined threshold (step S17: Y), the control section 112 determines that the condition of electricity transmission restart is not satisfied, and allows the electricity transmission operation to be not restarted.

Alternatively, the control section 112 may make determination on whether the condition of electricity transmission restart is satisfied or not in the following manner. Specifically, it is allowable that when the power-feeding objective unit is determined to be started, or when the power remaining quantity of the battery 214 is determined to be smaller than the predetermined threshold, the control section 112 determines that the condition of electricity transmission restart is satisfied, and allows the electricity transmission operation to be restarted. In other words, it is allowable that when the power-feeding objective unit is determined not to be started, or when the power remaining quantity of the battery 214 is determined to be equal to or larger than the predetermined threshold, the control section 112 determines that the condition of electricity transmission restart is not satisfied, and allows the electricity transmission operation to be not restarted.

In step S18 described above, the control section 112 determines whether or not the electricity transmission restart control (the entire processing) illustrated in FIG. 7 is finished. When the entire processing is determined to be not finished yet (step S18: N), the process is returned to the first step S11. When the entire processing is determined to be finished (step S18: Y), the electricity transmission restart control (the entire processing) by the control section 112 is finished.

In this way, in this embodiment, when charge of the battery 214 in the power-feeding objective unit (the electronic unit 2A or 2B) is completed based on power provided through electricity transmission using a magnetic field, electricity transmission operation of the electricity transmission section 110 is suspended. When the predetermined condition (the condition of electricity transmission restart) is satisfied after completion of such charge, the electricity transmission operation of the electricity transmission section 110 is controlled so as to be restarted. Consequently, even after charge is completed and the electricity transmission operation is suspended, opportunity of restart of the electricity transmission operation (opportunity of recharge of the battery 214) is secured.

As described above, in this embodiment, when charge of the battery 214 in the power-feeding objective unit (the electronic unit 2A or 2B) is completed based on power provided through electricity transmission using a magnetic field, the electricity transmission operation of the electricity transmission section 110 is allowed to be suspended, and when the predetermined condition is satisfied after completion of the charge, the electricity transmission operation is allowed to be restarted. Consequently, even after charge is completed and the electricity transmission operation is suspended, it is possible to secure opportunity of restart of the electricity transmission operation. Consequently, it is possible to improve user convenience when power transmission is performed using a magnetic field.

Modification

Subsequently, a modification of the above-described embodiment is described.

The above-described embodiment has been described with an exemplary case where the control section 112 in the power feeding unit 1 determines whether electricity transmission is restarted or not (whether the condition of electricity transmission restart is satisfied or not). In contrast, in this modification, the control section 216 in the electronic unit 2A or 2B determines whether request of electricity transmission restart (request of power feeding restart) is made or not (whether a condition of electricity transmission restart is satisfied or not). It is to be noted that the same components as those in the embodiment are designated by the same numerals, and description of them is appropriately omitted.

Specifically, when charge of the battery 214 is completed and electricity transmission operation is suspended, and when the predetermined condition (the condition of electricity transmission restart) is satisfied, the control section 216 in this modification notifies the power feeding unit 1 of request of electricity transmission restart using intercommunication with the power feeding unit 1, etc. More specifically, the control section 216 determines whether the condition of electricity transmission restart is satisfied or not based on one or more of a determination result on whether its own unit exists adjacent to the power feeding unit 1 or not, a determination result on whether the own unit is started or not, and a determination result on whether the power remaining quantity of the battery 214 is equal to or larger than a predetermined threshold. Such request processing of electricity transmission restart is described in detail below.

FIG. 8 is a flowchart illustrating an example of request processing of electricity transmission restart of this modification, in which the operation state after completion of charge of the battery 214 (during suspension of power feeding operation) is assumed as a start point (start state), as in the case of FIG. 7.

In this request processing of electricity transmission restart, first, the control section 216 determines whether or not its own unit (the electronic unit 2A or 2B) exists adjacent to the power feeding unit 1 (is located on the electricity transmission surface S1) using intercommunication with the power feeding unit 1 (step S21 of FIG. 8). Specifically, first, the control section 216 performs determination on request of electricity transmission restart based on the determination result on whether the own unit exists adjacent to the power feeding unit 1 or not. Examples of other methods of determining whether the own unit exists adjacent to the power feeding unit 1 or not include the following method. Specifically, there is a method where the electronic unit 2A or 2B detects magnetic force lines generated in the power feeding unit 1 and is thus started, and at that time point, the control section 216 recognizes that the own unit is located adjacent to the power feeding unit 1. In the case of using this method, if the electronic unit 2A or 2B does not detect the magnetic force lines, such operation of the electronic unit 2A or 2B is suspended.

When the electronic unit 2A or 2B is determined not to exist adjacent to the power feeding unit 1 (step S21: N), the control section 216 determines that the condition of electricity transmission restart is not satisfied. In this case, therefore, request of electricity transmission restart is not made, and the process is advanced to step S25 described later.

On the other hand, when the electronic unit 2A or 2B is determined to exist adjacent to the power feeding unit 1 (step S21: Y), the control section 216 then makes determination on request of electricity transmission restart using one or both of start situation information and power remaining quantity information held as unit information on its own unit. In this exemplary case, for instance, as described below, the control section 216 uses both the start situation information and the power remaining quantity information to make determination on request of electricity transmission restart (steps S22 and S24).

Specifically, first, the control section 216 determines whether the own unit is started or not (is in an activated state or not) based on the start situation information (step S22). When the own unit is determined to be started (step S22: Y), the control section 216 determines that the condition of electricity transmission restart is satisfied since the power remaining quantity of the battery 214 is decreased in the activated state. Hence, the control section 216 notifies the power feeding unit 1 of the request of electricity transmission restart using intercommunication with the power feeding unit 1, etc. (step S23). Consequently, the power feeding unit 1 is prompted to restart electricity transmission operation, and the battery 214 in the electronic unit 2A or 2B is recharged. It is to be noted that after request of electricity transmission restart is made in this way, the process is advanced to step S25 described later.

On the other hand, when the own unit is determined not to be started (step S22: N), the control section 216 then determines whether or not the power remaining quantity of the battery 214 is equal to or larger than a predetermined threshold based on the power remaining quantity information (step S24). Specifically, in this exemplary case, the control section 216 determines whether or not the battery voltage Vb is equal to or higher than a predetermined threshold Vth.

When the battery voltage Vb is determined to be lower than the threshold Vth (step S22: N), the control section 216 determines that the condition of electricity transmission restart is satisfied since the power remaining quantity of the battery 214 is small (insufficient), and provides notification of request of electricity transmission restart (step S23). Consequently, in this case, the power feeding unit 1 is also prompted to restart the electricity transmission operation, and the battery 214 in the electronic unit 2A or 2B is recharged.

On the other hand, when the battery voltage Vb is determined to be equal to or higher than the threshold voltage Vth (step S24: Y), the control section 216 determines that the condition of electricity transmission restart is not satisfied since the own unit is not started, and the power remaining quantity of the battery 214 is sufficient. In other words, in this case, the control section 216 determines that recharge of the battery 214 is unnecessary. Hence, in this case, request of electricity transmission restart is not made, and the process is advanced to step S25 described later.

In this way, in this exemplary case, when the own unit is determined not to be started (step S22: N), and the power remaining quantity is determined to be equal to or larger than the predetermined threshold (step S214: Y), the control section 216 determines that the condition of electricity transmission restart is not satisfied, and does not provide notification of request of electricity transmission restart.

Alternatively, as with the above-described embodiment, the control section 216 may make determination on whether the condition of electricity transmission restart is satisfied or not in the following manner. Specifically, it is allowable that when the own unit is determined to be started, or when the power remaining quantity of the battery 214 is determined to be smaller than the predetermined threshold, the control section 216 determines that the condition of electricity transmission restart is satisfied, and provides notification of request of electricity transmission restart. In other words, it is allowable that when the own unit is determined not to be started, or when the power remaining quantity of the battery 214 is determined to be equal to or larger than the predetermined threshold, the control section 216 determines that the condition of electricity transmission restart is not satisfied, and does not provide notification of request of electricity transmission restart.

In step S25 described above, the control section 216 determines whether or not the request processing of electricity transmission restart (the entire processing) illustrated in FIG. 8 is finished. When the entire processing is determined to be not finished yet (step S25: N), the process is returned to the first step S21. When the entire processing is determined to be finished (step S25: Y), the request processing of electricity transmission restart (the entire processing) by the control section 216 is finished.

In this way, in this modification, when charge of the battery 214 in the power-feeding objective unit (the electronic unit 2A or 2B) is completed based on power provided through electricity transmission using a magnetic field and electricity transmission is suspended, and when the predetermined condition (the condition of electricity transmission restart) is satisfied, the following operation is performed. Specifically, the electronic unit 2A or 2B notifies the power feeding unit 1 that electricity transmission restart is requested. The control section 112 in the power feeding unit 1 determines whether the condition of electricity transmission restart is satisfied or not (whether the electricity transmission operation is restarted or not) depending on whether or not notification of such request of the electricity transmission restart is provided from the power-feeding objective unit. Specifically, when notification of such request of the electricity transmission restart is provided from the power feeding unit 1, and allows the electricity transmission operation to be restarted. In this way, even after charge is completed and the electricity transmission operation is suspended, the power feeding unit 1 is prompted to restart electricity transmission; hence, opportunity of restart of the electricity transmission operation (opportunity of recharge of the battery 214) is easily secured As described above, in this modification, when charge of the battery 214 is completed based on power provided through electricity transmission using a magnetic field and the electricity transmission operation is suspended, and when the predetermined condition is satisfied, the electronic unit 2A or 2B notifies the power feeding unit 1 of request of electricity transmission restart. Consequently, even after charge is completed and electricity transmission operation is suspended, it is possible to easily secure opportunity of restart of the electricity transmission operation. Consequently, in this modification, it is also possible to improve user convenience when power transmission is performed using a magnetic field.

Alternatively, "notification of request of electricity transmission restart" from the electronic unit 2A or 2B to the power feeding unit 1 may be made as a response to an inquiry from the power feeding unit 1 on whether the predetermined condition (the condition of electricity transmission restart) is satisfied or not. In other words, the control section 216 in the electronic unit 2A or 2B may provide "notification of request of electricity transmission restart" as a response to an inquiry from the power feeding unit 1 on whether the above-described condition is satisfied or not.

Other Modifications

Although the technology of the present disclosure has been described with an embodiment and a modification hereinbefore, the technology is not limited thereto, and various modifications or alterations thereof may be made.

For example, although the above-described embodiment and modification are described with various coils (the electricity transmission coil and the electricity reception coil), configurations (shapes) of such coils may include any of various types. Specifically, each coil may have, for example, a spiral shape, a loop shape, a bar shape using a magnetic material, an α-round shape including a spiral coil that is disposed in two layers in a folded manner, a spiral shape having more layers, and a helical shape with a winding wound in a thickness direction. Each coil may be not only a winding coil configured of a conductive wire rod, but also a conductive pattern coil configured of a printed circuit board or a flexible printed circuit board.

Also, although the above-described embodiment and modification have been described with electronic units as an example of the power-feeding objective unit, the power-feeding objective unit is not limited thereto, and may be a unit (for example, a vehicle such as an electric car) other than the electronic units.

Furthermore, although the above-described embodiment and modification have been described with the specific components of the power feeding unit and the electronic units, it is not necessary to provide all of the components. Also, other components may be further provided. For example, the power feeding unit or the electronic units may incorporate a communication function, a certain control function, a display function, an authentication function of a secondary unit, and a function of detecting contamination of a dissimilar metal, etc.

In addition, although the above-described embodiment and modification have been described with an exemplary case where a plurality of (two) electronic units are provided in the power feeding system, such a case is not limitative, and only one electronic unit may be provided in the power feeding system.

Also, although the above-described embodiment and modification have been described with a charging tray for a small electronic unit (CE unit) such as a mobile phone as an example of the power feeding unit, the power feeding unit is not limited to such a household charging tray, and may be applicable as a charger of any of various electronic units. Moreover, the power feeding unit may not necessarily be a tray, and may be, for example, a stand for an electronic unit, such as a so-called cradle.

(Example of Performing Power Transmission in Noncontact Manner Using Electric Field)

Although the above-described embodiment and modification have been described with an exemplary case of the power feeding system that performs power transmission (power feeding) from the power feeding unit as a primary unit to the electronic unit as a secondary unit in a noncontact manner with a magnetic field, this is not limitative. Specifically, the contents of the disclosure are applicable to a power feeding system that performs power transmission from a power feeding unit as a primary unit to an electronic unit as a secondary unit in a noncontact manner with an electric field (electric field coupling). In such a case, it is possible to obtain effects similar to those in the above-described embodiment and modification.

Specifically, for example, a power feeding system illustrated in FIG. 9 includes one power feeding unit 81 (a primary unit) and one electronic unit 82 (a secondary unit). The power feeding unit 81 mainly includes an electricity transmission section 810 including an electricity transmission electrode E1 (a primary electrode), an AC signal source 811 (an oscillator), and an earth electrode Eg1. The electronic unit 82 mainly includes an electricity reception section 820 including an electricity reception electrode E2 (a secondary electrode), a rectifier circuit 821, a load 822, and an earth electrode Eg2. That is, this power feeding system includes two sets of electrodes, i.e., the electricity transmission electrode E1 and the electricity reception electrode E2, and the earth electrodes Eg1 and Eg2. In other words, the power feeding unit 81 (primary unit) and the electronic unit 82 (secondary unit) each incorporate an antenna configured of a pair of asymmetric electrode structures such as a monopole antenna.

In the power feeding system having such a configuration, when the electricity transmission electrode E1 and the electricity reception electrode E2 are opposed to each other, the above-described noncontact antennas are coupled to each other (electrically coupled to each other along a vertical direction of each electrode). An induction electric field is therefore generated between the electrodes, so that power transmission using the electric field is performed (see power P8 illustrated in FIG. 9). Specifically, for example, as schematically illustrated in FIG. 10, the generated electric field (induction electric field Ei) is transmitted from the electricity transmission electrode E1 to the electricity reception electrode E2, while the generated induction electric field Ei is transmitted from the earth electrode Eg2 to the earth electrode Eg1. In other words, a loop path of the generated induction electric field Ei is formed between the primary unit and the secondary unit. In such a noncontact power supply system using the electric field, it is also possible to obtain the effects similar to those in the above-described embodiment and modification through use of the technique similar to that of each of the above-described embodiment and modification.

The present technology may have the following configurations.

(1)

A power feeding unit, including:

an electricity transmission section configured to perform electricity transmission using one of a magnetic field and an electric field to a power-feeding objective unit having a secondary battery; and an electricity transmission control section configured to control electricity transmission operation of the electricity transmission section, wherein the electricity transmission control section allows the electricity transmission operation to be suspended when charge of the secondary battery is completed based on power provided through the electricity transmission, and allows the electricity transmission operation to be restarted when a predetermined condition is satisfied after completion of the charge.

(2)

The power feeding unit according to (1), wherein the electricity transmission control section determines whether the condition is satisfied or not based on examination by the electricity transmission control section itself.

(3)

The power feeding unit according to (2), wherein the electricity transmission control section makes determination on restart of the electricity transmission operation based on a determination result on whether or not the power-feeding objective unit adjacently exists.

(4)

The power feeding unit according to (3), wherein when the power-feeding objective unit is determined not to adjacently exist, the electricity transmission control section determines that the condition is not satisfied, and does not restart the electricity transmission operation, while when the power-feeding objective unit is determined to adjacently exist, the electricity transmission control section acquires unit information on that power-feeding objective unit, and makes determination on restart of the electricity transmission operation based on the unit information.

(5)

The power feeding unit according to (4), wherein the electricity transmission control section uses identification information as the unit information to determine whether or not a power-feeding objective unit that adjacently exists is the same unit as the power-feeding objective unit of which the charge is completed, and makes determination on restart of the electricity transmission operation based on a result of the determination.

(6)

The power feeding unit according to (5), wherein when the power-feeding objective unit that adjacently exists is determined not to be the same unit, the electricity transmission control section newly starts the electricity transmission operation to that power-feeding objective unit, while when the power-feeding objective unit that adjacently exists is determined to be the same unit, the electricity transmission control section makes determination on restart of the electricity transmission operation.

(7)

The power feeding unit according to any one of (2) to (6), wherein the electricity transmission control section uses one or both of start situation information as unit information on the power-feeding objective unit and power remaining quantity information of the secondary battery to make determination on restart of the electricity transmission operation.

(8)

The power feeding unit according to (7), wherein when the power-feeding objective unit is determined to be started based on the start situation information, or when the power remaining quantity of the secondary battery is determined to be smaller than a predetermined threshold based on the power remaining quantity information, the electricity transmission control section determines that the condition is satisfied, and allows the electricity transmission operation to be restarted, while when the power-feeding objective unit is determined not to be started based on the start situation information, or when the power remaining quantity is determined to be equal to or larger than the threshold based on the power remaining quantity information, the electricity transmission control section determines that the condition is not satisfied, and allows the electricity transmission operation to be not restarted.

(9)

The power feeding unit according to (8), wherein when the power-feeding objective unit is determined not to be started, and when the power remaining quantity is determined to be equal to or larger than the threshold, the electricity transmission control section determines that the condition is not satisfied, and allows the electricity transmission operation to be not restarted.

(10)

The power feeding unit according to (1), wherein the electricity transmission control section determines whether the condition is satisfied or not depending on whether or not notification of request of restart of the electricity transmission is provided from the power-feeding objective unit.

(11)

The power feeding unit according to (10), wherein the notification of request of restart of the electricity transmission from the power-feeding objective unit is provided as a response to an inquiry from the power feeding unit on whether the condition is satisfied or not.

(12)

The power feeding unit according to any one of (1) to (11), wherein the electricity transmission control section determines whether the condition is satisfied or not using intercommunication with the power-feeding objective unit.

(13)

The power feeding unit according to (12), wherein the communication is performed at a lower frequency in a period after completion of the charge than in a period before completion of the charge.

(14)

A power feeding system, including:

one or more electronic units each including a secondary battery; and a power feeding unit configured to perform electricity transmission to the electronic units using one of a magnetic field and an electric field, wherein the power feeding unit includes:

an electricity transmission section that performs electricity transmission; and an electricity transmission control section that controls electricity transmission operation of the electricity transmission section, wherein the electricity transmission control section allows the electricity transmission operation to be suspended when charge of the secondary battery is completed based on power provided through the electricity transmission, and allows the electricity transmission operation to be restarted when a predetermined condition is satisfied after completion of the charge.

(15)

An electronic unit, including:

an electricity reception section configured to receive power from a power feeding unit, the power being provided through electricity transmission using one of a magnetic field and an electric field;

a secondary battery configured to be charged based on the power received by the electricity reception section; and a control section configured to perform predetermined control, wherein when charge of the secondary battery is completed and the electricity transmission is suspended, and when a predetermined condition is satisfied, the control section notifies the power feeding unit of request of restart of the electricity transmission.

(16)

The electronic unit according to (15), wherein the control section provides notification of request of restart of the electricity transmission as a response to an inquiry from the power feeding unit on whether the condition is satisfied or not.

(17)

The electronic unit according to (15) or (16), wherein the control section determines whether the condition is satisfied or not based on one or more of a determination result on whether its own unit exists adjacent to the power feeding unit or not, a determination result on whether the own unit is started or not, and a determination result on whether or not the power remaining quantity of the secondary battery is equal to or larger than a predetermined threshold.

The invention claimed is:

1. An electronic device comprising:
   a storage storing power provided through power transmission using one of a magnetic field and an electric field; and
   a controller controlling a charge operation of the storage, wherein the controller:
   suspends the charge operation when charging of the storage is completed, and
   restarts the charge operation based on device information that indicates whether or not the electronic device is in an activated state and whether or not a quantity of power remaining in the storage is equal to or larger than a predetermined threshold, and
   wherein the controller restarts the charge operation:
   in case where the electronic device is in the activated state,
   in case where the electronic device is not in the activated state and the quantity of power remaining in the storage is not equal to or not larger than the predetermined threshold, and
   wherein the electronic device not being in the activated state is distinct from the charge operation being suspended.

2. The electronic device according to claim 1, wherein the device information includes identification information.

3. The electronic device according to claim 1, wherein the device information includes start situation information indicating a start situation of the electronic device.

4. The electronic device according to claim 1, wherein the controller restarts the charge operation by notifying a power feeding device.

5. The electronic device according to claim 1, wherein the controller restarts the charge operation when the electronic device is located adjacent to a power feeding device.

6. The electronic device according to claim 5, wherein the controller determines that the electronic device is located adjacent to the power feeding device by detecting force lines of the one of the magnetic field and the electric field generated by the power feeding device.

7. A power feeding device, comprising:
 a power transmission circuit performing power transmission using one of a magnetic field and an electric field to a power-feeding objective device having a storage; and
 a controller controlling a power transmission operation of the power transmission circuit,
 wherein the controller:
  suspends the power transmission operation when charging of the storage via power provided through the power transmission is completed, and
  restarts the power transmission operation based on power-feeding objective device information that indicates whether or not the power-feeding objective device is in an activated state and whether or not a quantity of power remaining in the storage of the power-feeding objective device is equal to or larger than a predetermined threshold,
 wherein the controller restarts the power transmission operation:
  in a case where the power feeding objective device is in the activated state, and
  in a case where the power feeding objective device is not in the activated state and the quantity of power remaining in the storage of the power feeding objective device is not equal to or not larger than the predetermined threshold, and
 wherein the power feeding objective device not being in the activated state is distinct from the power transmission operation being suspended.

8. The power feeding device according to claim 7, wherein the controller restarts the power transmission operation when the power-feeding objective device is located adjacent to the power feeding device.

9. The power feeding device according to claim 8, wherein the controller restarts the power transmission operation when identification information of the power-feeding objective device located adjacent to the power feeding device corresponds to identification information of a power-feeding objective located adjacent to the power feeding device when the power transmission operation was suspended.

10. The power feeding device according to claim 7, wherein the power transmission operation includes a power feeding period and a communication period provided in a time-divisional manner.

11. The power feeding device according to claim 10, wherein a frequency of the power feeding period is greater than a frequency of the communication period during the power transmission operation.

12. The power feeding device according to claim 11, wherein a ratio of the frequency of the power feeding period to the frequency of the communication period during the power transmission operation is 9 to 1.

13. The power feeding device according to claim 12, wherein a frequency of the communication period when the power transmission operation is suspended is less than a frequency of the communication period during the power transmission.

14. A power control system comprising:
 a power feeding device including a power transmission circuit that performs power transmission using one of a magnetic field and an electric field to a power-feeding objective device having a storage and a controller; and
 at least one electronic device including a storage that stores power provided through the power transmission using the one of the magnetic field and the electric field,
 wherein the controller:
  suspends the power transmission operation when charging of the storage of the at least one electronic device via power provided through the power transmission is completed, and
  restarts the power transmission operation based on at least one electronic device information that indicates whether or not the at least one electronic device is in an activated state and whether or not a quantity of power remaining in the storage of the at least one electronic device is equal to or larger than a predetermined threshold,
 wherein the controller restarts the power transmission operation:
  in a case where the at least one electronic device is in the activated state, and
  in a case where the at least one electronic device is not in the activated state and the quantity of power remaining in the storage of at least one electronic device is not equal to or not larger than the predetermined threshold, and
 wherein the at least one electronic device not being in the activated state is distinct from the power transmission operation being suspended.

15. The power control system according to claim 14, wherein the controller restarts the power transmission operation when the power-feeding objective device is located adjacent to the power feeding device.

* * * * *